April 12, 1966 R. J. BISSO 3,246,274

PHOTOCONDUCTIVE DEVICE AND FABRICATION PROCESS

Filed Oct. 2, 1963

3 Sheets-Sheet 1

INVENTOR
Robert J. Bisso
BY
Robert E. Strauss
ATTORNEY

April 12, 1966 R. J. BISSO 3,246,274

PHOTOCONDUCTIVE DEVICE AND FABRICATION PROCESS

Filed Oct. 2, 1963

3 Sheets-Sheet 2

INVENTOR
Robert J. Bisso
BY
Robert E. Strauss
ATTORNEY

April 12, 1966 R. J. BISSO 3,246,274

PHOTOCONDUCTIVE DEVICE AND FABRICATION PROCESS

Filed Oct. 2, 1963

3 Sheets-Sheet 3

INVENTOR
Robert J. Bisso
BY
Robert E. Strauss
ATTORNEY

United States Patent Office 3,246,274

Patented Apr. 12, 1966

3,246,274
PHOTOCONDUCTIVE DEVICE AND FABRICATION PROCESS

Robert J. Bisso, Emporium, Pa., assignor to Sylvania Electric Products Inc., a corporation of Delaware
Filed Oct. 2, 1963, Ser. No. 313,234
10 Claims. (Cl. 338—15)

This invention relates to photoconductive devices and a process for fabricating such devices.

Photoconductive devices are frequently produced in accordance with one of two well-known and popular techniques. In one process, detailed in U.S. Patent No. 2,843,-914, issued to F. Koury on July 22, 1958, cadmium sulfide powders having suitable quantities of activator and coactivator added thereto are pressed into a disc-shaped configuration which is sintered in air for a period and at a temperature sufficient to provide a disc of desired photosensitivity. Then a metallized layer is deposited on a surface of the disc in a manner which provides an interdigital pattern wherein two metallized areas are separated by photosensitive material. Thus, the characteristic resistance of the surface and of the device is directly proportional to the length of the separation between the metallized areas and inversely proportional to the width of the separation therebetween.

Following, the metallized disc is mounted on a substrate and each of the areas connected to an electrical conductor which is sealed into and extends through an envelope to provide electrical access to the disc encapsulated therein. Thereafter, the envelope is exhausted, refilled with a dry and inert atmosphere, and hermetically sealed or merely sealed with a plastic material. In a second technique, the cadmium sulfide is deposited in the form of a thin film onto a ceramic substrate and processed in a manner similar to the above-described procedure to provide a photoconductive device.

Although the above techniques provide excellent photoconductive devices and are extensively used, such devices do have limitations which render them inadequate for numerous applications. For example, devices fabricated in accordance with the above techniques have a power dissipation rating which is limited by the surface area of the pressed disc or thin film adhered to the substrate. Moreover, the cooling of the wafer surface by conduction is limited by the thermal conduction properties of the thin metallized film pattern. Additionally, in both methods of fabrication the resistance of the metallized wafer is fixed at a predetermined value which is determined by the geometry of the interdigital pattern and once the metallized pattern has been applied, desired alterations in the resistance of the device are no longer practical.

Therefore, it is an object of this invention to enhance the power dissipation capability of a photoconductive device.

Another object of this invention is to improve the control of resistance in a photoconductive device.

Still another object of the invention is to improve the conductive cooling capabilities of a photosensitive surface.

A further object of this invention is to improve the fabrication technique for a photoconductive device.

A still further object of the invention is to improve the uniformity of resistance of photoconductive devices during the fabrication thereof.

Still another object of this invention is to improve the technique for providing alterable photoconductive devices at a minimum expense and with a minimum variation in the assembly process.

Briefly, these objects are fulfilled in one aspect of the invention by the provision of a plurality of alternate layers of photosensitive material and conductive spacers electrically interconnected. The spacers are selectively connected to a selected pair of electrical conductors within a hermetically sealed transparent envelope and the conductors are sealed into and extend through the envelope to provide external electrical access. Also, a plurality of photoconductive cells wherein each cell has a pair of conductive spacers separated by a photosensitive layer may be spaced and selectively attached to electrical conductors within an envelope to provide a modular photoconductive device.

For a better understanding of the present invention, together with other and further objects, advantages, and capabilities thereof, reference is made to the following disclosure and appended claims in connection with the accompanying drawings in which:

Figure 3:
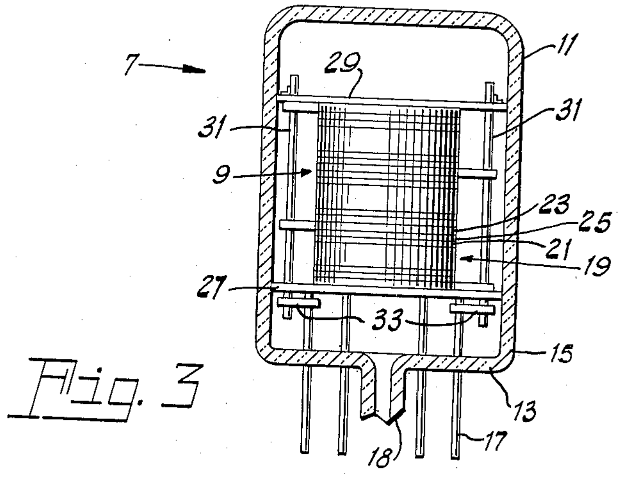
FIG. 3 is a diagrammatic illustration of a photoconductive device having enhanced power dissipation capabilities.
Figure 7A:
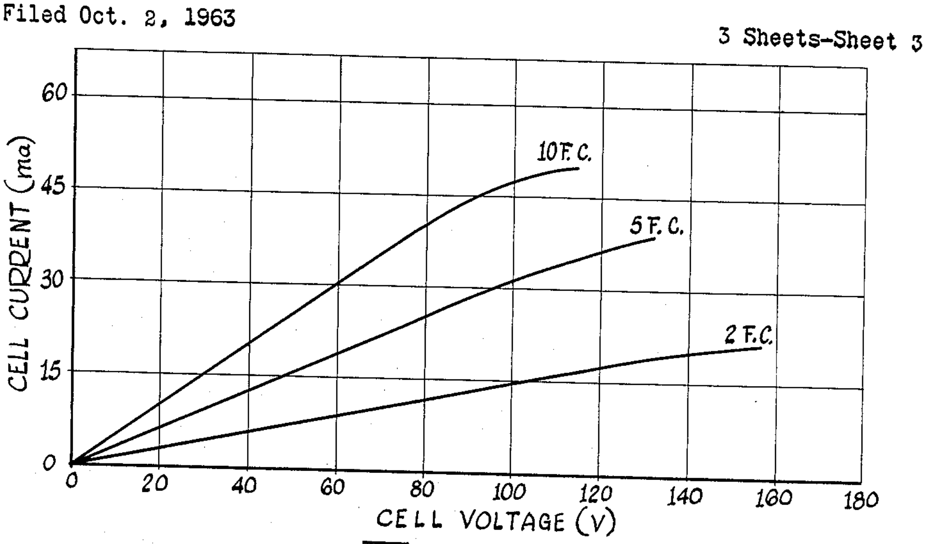
Figure 7B:
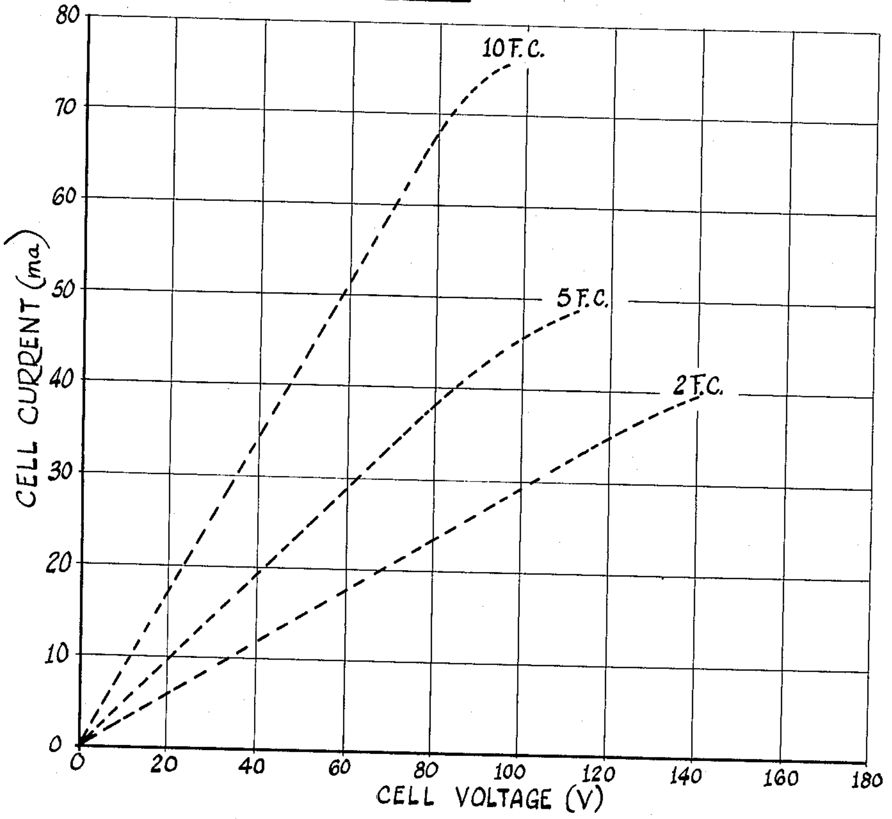

FIG. 7*a* is a current-voltage plot at various light levels of the device of FIG. 3 with 180° illumination; and FIG. 7*b* is a current-voltage plot at various light level of the device of FIG. 3 with 360° illumination.

Figure 1:
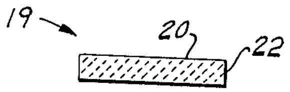
FIG. 1 is a cross-sectional view of a disc of photosensitive material.
Figure 2:
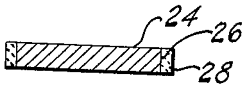
FIG. 2 is a cross-sectional view of another embodiment of a disc adapted for inclusion in a photoconductive device.

Referring to the drawings, FIG. 1 illustrates a cross-sectional view of a disc of photosensitive material adapted for inclusion in a photoconductive device. The disc 19 has a diametrical surface 20 and a peripheral surface 22 whereon the activating light is impinged. FIG. 2 illustrates a cross-sectional view of another embodiment of a photosensitive disc wherein the diametrical surface 24 is metal and the peripheral surface 26 has a layer 28 of photosensitive material adhered thereto. The layer 28 encompasses the peripheral surface 26 thereby permitting activation in a 360° circle.

Referring to FIG. 3 of the drawings, there is illustrated a photoconductive device which includes a hermetically sealed envelope 7 containing an assembly 9 and a dry inert atmosphere.

The envelope 7 is a light transparent or at least has a transparent portion and may be of a material such as ceramic, plastic, and preferably glass. The tubular bulb 11 is hermetically sealed to a header 13 at a jointure 15. The header 13 is a structure well known in the electron tube art and has a plurality of electrical conductors 17 sealed therein and extending therethrough to provide external electrical access within the envelope 7. The header 13 also has a hollow tube 18 attached thereto which provides a convenient means for selectively altering the atmosphere within the envelope 7 after the hermetic sealed jointure 15 has been completed.

The assembly 9 includes a plurality of photosensitive discs 19 having a metallized layer 21 on the diametrical surfaces thereof. Each metallized layer 21 is connected to an electrically conductive metal spacer 23 by means of an electrically conductive adhesive layer 25. The discs 19 and metal spacers 23 are disposed in a stack intermediate a pair of insulators 27 and 29 having a pair of support rods 31 extending therethrough to which the spacers 23 are alternately connected.

The support rods 31 are selectively attached to conductors 17 by connectors 33 and the insulators 27 and 29 with the stacked discs 19 and spacers 23 intermediate thereto have a diameter such that the peripheral surfaces thereof contact the inner wall of the envelope 7 and thereby maintain the assembly 9 in rigid longitudinal alignment and spaced from the envelope 7.

The insulator 27 is upheld by the conductors 17 and the stacked discs 19 and spacers 23 are supported thereby. This stack of discs 19 and spacers 23 is held in position by the insulator 29 which is attached to the support rods 31.

The discs 19 are of a photosensitive material such as cadmium sulphide powders with suitable quantities of activator and coactivator added thereto and fabricated in a manner disclosed in the previously mentioned Patent No. 2,843,914, issued to F. Koury. The discs 19 also have a metallized layer 21 deposited on the diametrical surfaces thereof which provides electrical contact between the spacers 23 and the discs 19. This metallized layer 21 may be deposited by any one or numerous well-known techniques for depositing a metal surface.

The metal spacers 23 are of nickel plated steel although any metal may be used which is adapted to heat and electrical conduction. These spacers 23 are attached to the metallized layer 21 of the discs 19 by an electrically conductive adhesive 25 such as silver paint or any of a number of conducting and adhesive epoxy materials readily available and widely used for such purposes. Also, the spacers 23 are alternately connected to the support rods 31 to provide an interdigital pattern having a characteristic resistance which varies in proportion to the variation in the thickness of the discs 19. Alternately, the discs 19 may be replaced by rectangular wafers, thin films, and almost innumerable configurations so long as the rim or peripheral surface thereof is a photosensitive material.

The use of photoconductive devices by manufacturers of equipment has been somewhat restricted because of the combined requirements of adequate power dissipation within a restricted space at an economical cost. Moreover, the dissimilarity of applicational uses for such devices has led to a wide range of customized units which presents a serious economical problem to those attempting to fabricate and sell such devices.

Figure 4:
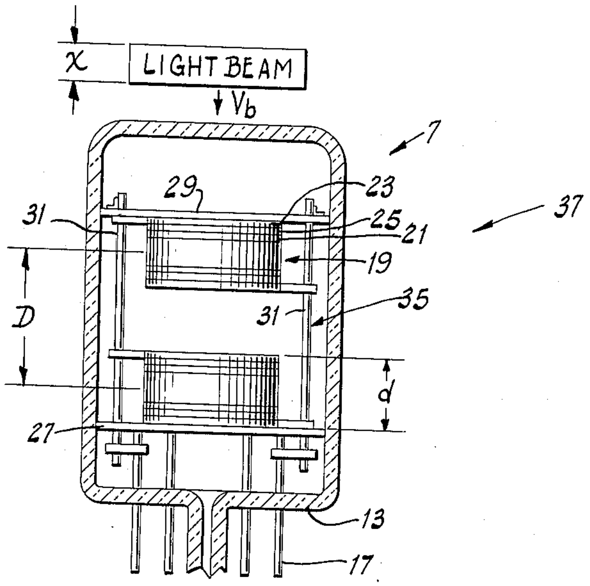
FIG. 4 is a diagrammatic illustration of a modular photoconductive device including an activating source for the device.

These problems are greatly reduced by modification of the previously described structure to provide a modular device as illustrated in FIG. 4. Herein, the envelope 7, header 13, and electrical conductors 17 are essentially the same as described for the above-mentioned structure.

The assembly 35 is similar to the assembly 9 of FIG. 1 in that the photosensitive discs 19 have a metallized layer 21 on the diametrical surfaces thereof and each metallized layer 21 is connected to an electrically conductive spacer 23 by means of an electrically conductive adhesive layer 25. The discs 19 and conductive spacers 23 are disposed intermediate a pair of insulators 27 and 29 having a pair of support rods 31 extending therethrough to which the spacers 23 are selectively attached. These support rods 31 are then attached to selected conductors 17 to provide external electrical access within the envelope 7.

Further, a pair of conductive spacers 23 having a photosensitive disc 19 therebetween provide an individual photoconductive cell 37 and a plurality of cells 37 may be incorporated to provide a modular structure. The cells 37 are supported by the conductive spacers 23 attached to the support rods 31 which permits variations in the spacing therebetween and affords great flexibility in the fabrication of customized units.

The spacing between the individual cells 37 is readily and economically altered and reliably controlled by simple mechanical measurement during the fabrication of the device. Also, the conductive spacers 23 may be selectively coupled to a plurality of electrical conductors 17 extending from the device to provide almost any type of series, parallel, and series-parallel circuitry. Moreover, coded outputs, differential outputs, logic circuits, multiple circuits, and many other variations can be provided or operated from a single module unit.

Figure 5:
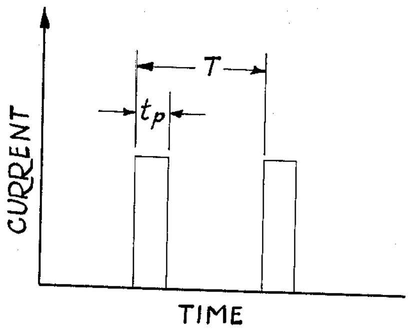
FIG. 5 is a plot of the output of the modular device of FIG. 4 in accordance with the illustrated activating source.

As an example, FIG. 4, in conjunction with FIG. 5, illustrates a pulsed output obtainable from such a device. For purposes of clarity, the wave forms of FIG. 5 have been idealized although the rise and fall of the pulse will be exponential and a function of the light level of the scanning beam.

Thus, the output of the device of FIG. 4 as illustrated in FIG. 5 may be expressed in accordance with the following equations:

$$t_p=\frac{X-d}{V_b}\quad T=\frac{D}{V_b}\quad PRR=\frac{V_b}{D}$$

wherein:

$t_p$=output pulse width
$d$=thickness of the cell 37
$D$=spacing from centerline to centerline of the cells 37
$X$=width of scanning light beam
$V_b$=velocity of scanning light beam
$PRR$=pulse repetition rate
$T$=pulse period As evident from the equations, the device has capabilities for numerous types of customized units with a minimum of change in fabrication technique. Also, the amplitude of the pulsed output may be altered by using discs 19 having a different value of resistance. Moreover, the power capabilities of the device are greater than those of any of the known photoconductive devices as will be illustrated by the following example with regard to FIG. 1.

As a specific example, ten (10) discs 19 were fabricated from cadmium sulfide powder which was pressed, sintered, and the diametrical surfaces thereof metallized with an aluminum layer. The discs 19 had a diameter of about 0.396 inch and a thickness of approximately 0.035 inch and were placed in a stack with a spacer 23 of 0.005 inch nickel-plated steel attached to and disposed intermediate the discs 19. The spacers 23 were then alternately connected to the support rods 31 and the support rods 31 were attached to a selected pair of conductors 17. Thereafter, the structure was processed in a manner common to photoconductive structures in that the envelope was hermetically sealed, evacuated, and refilled with a dry inert atmosphere.

The operational parameters of the device were similar to existing photoconductive devices in that the spectral response was a maximum at about 5,700 Angstroms with a 50 percent response at approximately 4,700 and 6,670 Angstroms. Moreover, the sensitivity of the device is comparable with numerous available photoconductive devices as indicated by the slope of the log-log plot of resistance and light level illustrated in FIG. 6.

Figure 6:
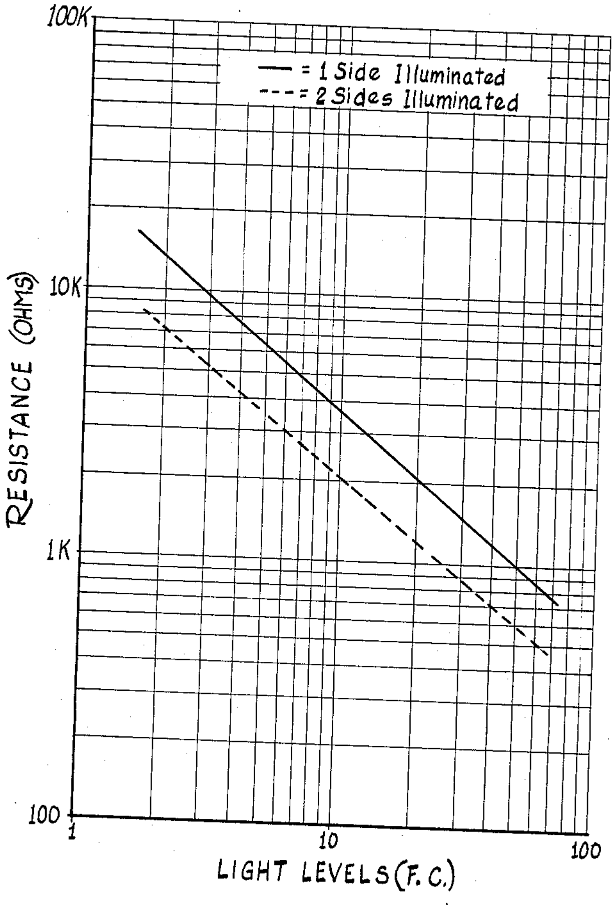
FIG. 6 is a log-log plot showing the resistance of the device of FIG. 3 at various light levels.

As evident from the description and the structure of FIG. 3, the photoconductive device is light sensitive in a complete circle of 360° which permits variations in the characteristics of the device by simply varying the area whereon the impinging light is directed. Thus, FIG. 6 illustrates the resistance light level plot of a cell with 180° thereof activated by light as well as the resistance thereof with 360° of light activation. As can be seen from the plot and as would be expected, illumination of a 360° area provides a resistance value of about one-half the resistance when only 180° of the photosensitive surface is illuminated. Also, the resistance value of the cell with 180° illumination and a light level of two foot candles is about 14.5K ohms which is within the range of resistance normally used in street lighting controls.

As to the power capabilities of the device, FIG. 7*a* and 7*b* are current-voltage plots of the cell at the standard color temperature of 2,870° K. with various amounts of illumination. As evident from the plot, the power dissipation is linear to a point whereat, it is believed, the heat dissipated in the device changes the resistance thereof and the plots become nonlinear. Thus, power dissipation capabilities of about 2.0 watts have been obtained wherein the current and voltage characteristics are linear and which, as far as is known, is unobtainable in any other photoconductive structure.

The power dissipation capabilities of the device are enhanced by the metal spacers intermediate the discs and the support rods attached to the spacers which cooperate to provide a "heat sink" for the device. Moreover, the characteristic resistance of the device is readily altered by varying the thickness of the discs or the number of discs in the stack. Thus, the device is not dependent upon a deposited interdigital pattern which is difficult to alter but may be readily adjusted during the assembly of the device at a minimum of expense. Obviously, such a means of control is not only desirable but provides devices having a resistance uniformity which is believed to be unobtainable by other fabrication techniques.

Additionally, a modular photoconductive device having the above enhanced power dissipation capabilities in a restricted space has provided both unique and, as far as is known, previously unobtainable results. Moreover, the reliability, flexibility, and economy of the fabrication technique has provided results which were unexpected and have been long sought in the industry.

While there has been shown and described what is at present considered the preferred embodiment of the invention, it will be obvious to those skilled in the art that various changes and modifications may be made therein without departing from the invention as defined by the appended claims.

What is claimed is:

1. A photoconductive device comprising:
a light transparent envelope having electrical conductors sealed therein and extending therethrough, and
an assembly attached to and supported by said conductors within said envelope, said assembly including alternate layers embodying photosensitive material all stacked in contacting relationship, and conductive material with each of said layers of conductive material alternately connected to one of a pair of said conductors and said photosensitive material including a peripheral photosensitive surface facing said envelope.

2. A photoconductive device comprising:
a light transparent envelope having electrical conductors sealed therein and extending therethrough, and
an assembly attached to and supported by said conductors within said envelope, said assembly including a stack of conductive layers in contacting relationship, alternate of said layers having a peripheral surface of photosensitive material facing the light transparent envelope and each of the conductive layers intermediate thereto alternately connected to one of a pair of said electrical conductors, the photosensitive material on said peripheral surface extending around a major portion thereof.

3. A photoconductive device comprising:
an envelope having electrical conductors sealed therein and extending therethrough and at least a light transparent portion, said envelope containing a dry inert atmosphere, and
an assembly attached to and supported by said conductors within said envelope, said assembly including a stack of conductive layers in contacting relationship, alternate of said conductive layers having a photosensitive peripheral surface facing said envelope light transparent portion and each of the conductive layers intermediate said layers having a photosensitive surface alternately connected to one of a pair of said electrical conductors.

4. A photoconductive device comprising:
a light transparent envelope having electrical conductors sealed therein and extending therethrough, and
an assembly attached to and supported by said conductors within said envelope, said assembly including a stack of photosensitive material discs and conductive spacers alternately disposed within contacting relationships, each of said conductive spacers alternately attached to one of a pair of said electrical conductors and each of said photosensitive material discs having a peripheral photosensitive surface facing said light transparent envelope.

5. A photoconductive device comprising:
a glass light transparent envelope containing a dry inert atmosphere and having electrical conductors sealed therein and extending therethrough, and
an assembly attached to said conductors within said envelope, said assembly including a plurality of alternate cadmium sulphide discs and metal spacers arranged in a stack in contacting relationship, with each of said spacers alternately attached to one of a pair of said electrical conductors, and each of said discs having a photosensitive peripheral surface facing said light transparent envelope.

6. A photoconductive device comprising:
a light transparent hermetically sealed glass envelope containing a dry inert atmosphere and having electrical conductors sealed therein and extending therethrough, and
an assembly attached to and supported by said conductors within said envelope, said assembly including a stack of alternate discs of photosensitive material and conductive metal material in contacting relationship, each of said discs of photosensitive material having a peripheral photosensitive surface facing said envelope and extending substantially 360° about the discs, said stack disposed intermediate and supported by a pair of insulators having a pair of rods extending therethrough and connected to selected ones of said conductors, each of said discs of conductive metal material alternately connected to one of said pair of rods.

7. A modular photoconductive device comprising:
a sealed envelope having a plurality of electrical conductors sealed therein and extending therethrough, said envelope having at least a portion thereof transparent to light, and
an assembly within said envelope, said assembly comprising a plurality of spaced and aligned photoconductive cells, each of said cells including a pair of conducting spacers selectively attached to and supported by said electrical conductors and a conductive layer intermediate and attached to said spacers, said conductive layer having a peripheral surface layer of photosensitive material exposed to said envelope light transparent portion.

8. A modular photoconductive device comprising:
a sealed envelope having a plurality of electrical conductors sealed therein and extending therethrough, said envelope having at least a portion thereof transparent to light, and
an assembly within said envelope, said assembly comprising a plurality of spaced and aligned photoconductive cells, each of said cells including a pair of conducting spacers selectively attached to and supported by said electrical conductors and separated by and attached to a layer having photosensitive material about a peripheral surface of 360° exposed to said envelope light transparent portion.

9. A modular photoconductive device comprising:
a sealed envelope having a plurality of electrical conductors sealed therein and extending therethrough, said envelope having at least a portion thereof transparent to light, and
an assembly within said envelope, said assembly comprising a stack of photosensitive material layers alternating wtih conductive spacers, said photosensitive material layers having the diametrical surfaces thereof metallized and in contact with the diametrical surface of said spacers and the peripheral surface thereof photosensitive throughout substantially the entire periphery thereof and exposed to said envelope light transparent portion, and said conductive spacers selectively attached to and supported by said electrical conductors.

10. A modular photoconductive device comprising:

a light transparent hermetically sealed glass envelope having a plurality of electrical conductors sealed therein and extending therethrough and containing a dry inert atmosphere, and an assembly within said envelope, said assembly comprising a plurality of spaced and aligned photoconductive cells, each of said cells including a pair of metal spacers selectively attached to said electrical conductors and separated by a disc of photosensitive material, said disc having metallized diametrical surfaces contacting said spacers and a peripheral photosensitive surface exposed to said envelope, said photosenstive surface extending at least about the major portion of the periphery.

References Cited by the Examiner

UNITED STATES PATENTS

| | | | |
|---|---|---|---|
| 1,156,524 | 10/1915 | Cox | 338—15 |
| 2,823,245 | 2/1958 | Solow | 338—17 X |
| 2,839,646 | 6/1958 | Hester | 338—19 |
| 2,843,914 | 7/1958 | Koury | 264—66 |
| 2,856,541 | 10/1958 | Jacobs | 250—211 |
| 2,900,523 | 8/1959 | Ruzicka | 250—211 |
| 2,908,594 | 10/1959 | Briggs | 338—19 X |
| 3,188,476 | 6/1965 | Karmiggelt et al. | 250—211 |

RICHARD M. WOOD, *Primary Examiner.*

H. T. POWELL, W. D. BROOKS, *Assistant Examiners.*